A. A. VAN ORSDALE.
LUBRICATOR.
APPLICATION FILED MAR. 1, 1920.
1,355,194. Patented Oct. 12, 1920.
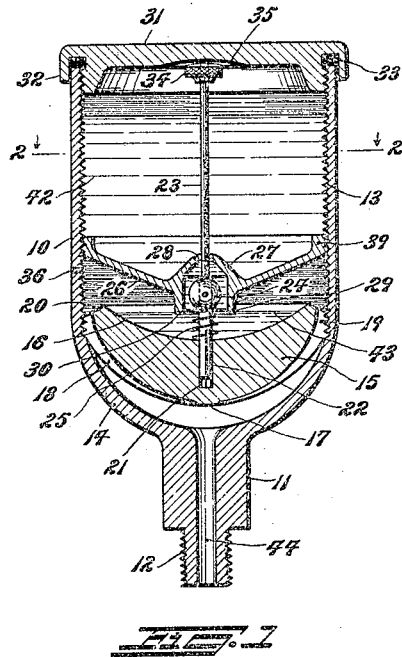
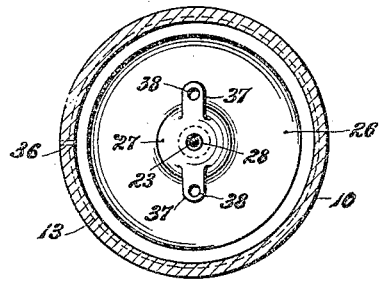
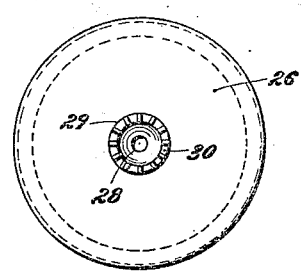
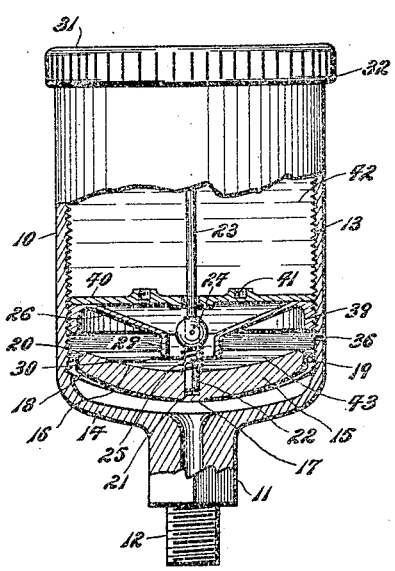
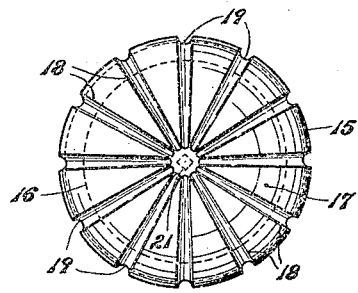
Allen A. Van Orsdale
INVENTOR.
BY Victor J. Evans
ATTORNEY.
Alfred T. Bratton
WITNESS:

UNITED STATES PATENT OFFICE.

ALLEN A. VAN ORSDALE, OF PHILADELPHIA, PENNSYLVANIA.

LUBRICATOR.

1,355,194.   Specification of Letters Patent.   Patented Oct. 12, 1920.

Application filed March 1, 1920. Serial No. 362,619.

*To all whom it may concern:*

Be it known that I, ALLEN A. VAN ORSDALE, a citizen of the United States, residing at Philadelphia, in the county of Philadelphia and State of Pennsylvania, have invented new and useful Improvements in Lubricators, of which the following is a specification.

This invention relates to lubricators and it has more particular reference to that type of lubricator which is more or less dependent upon the vibrations of the movable or vibrating parts of the machine or engine to which it is attached for feeding or introducing the lubricant thereto.

The main object of my invention is to provide a lubricator in which the emission of the lubricant is in the nature of a "splash" caused by the vibration of the moving part, said "splash" being automatically directed in its flow to cause a drop by drop or drip feed.

Another object of this invention is to provide a lubricator which is automatic and positive in its action when applied to the vibrating parts of machines or engines.

Still further this invention provides a lubricator in which the lubricant constitutes a seal whereby the feed is automatically cut-off when the movable or vibrating part on which it is attached is at rest, but which emits the lubricant consonant with the degree or rapidity of the vibrations when the movable or vibrating part is in motion.

Another object of the invention is to provide a lubricator of the type referred to which includes but few very simple and easily constructed parts that are readily assembled or dissociated, and which furthermore provide for the quick flushing or refilling operations when necessary.

With the foregoing and other objects in view as will later on be more apparent my invention consists essentially in the novel features of construction, combination and arrangement of parts hereinafter fully described and more specifically defined by the appended claims.

In the further disclosure of the invention reference is to be had to the accompanying sheet of explanatory drawings constituting a part of this specification and in which like characters of reference designate the same or similar parts in all the views.

Figure 1— is a central vertical section through a lubricator embodying my present invention.

Fig. 2— is a transverse section taken substantially on the line 2—2 in the preceding figure.

Fig. 3— is an underside plan of the valve seat and diaphragm member hereinafter more particularly described.

Fig. 4— is an underside plan view of the sealing member and feed director; and

Fig. 5— is a broken sectional elevation of a slightly modified form of the invention.

Referring more particularly to Figs. 1 to 4 of the drawings the numeral 10, designates a lubricant reservoir which is provided with the usual axial extension 11 of approved cross-section and threaded nipple 12 by means of which the device can be readily connected in position or removed as desired. The lubricant reservoir 10 is preferably internally threaded at 13 down to the basal portion 14, and arranged to be screwed down into said reservoir is a concavo-convex insert 15, the upper or convex portion 16 whereof constitutes a shallow or dished portion for the purpose hereafter explained, while the lower or concave portion 17 is fashioned with a series of radiating tapered grooves 18 terminating at the peripheral edge in vertical notches or channels 19. It is also to be noted that the insert 15 is chamfered or tapered about its upper peripheral edge at 20 so that the lubricant passing over the upper edge thereof will automatically flow down into the channels 19.

Axially central of the concavo-convex insert 15 there is provided a hole 21—conveniently of rectilinear—cross section—which houses the correspondingly shaped lower portion 22, of a valve stem 23, and on said stem there is formed or fixed a ball valve 24 between which and the dished part 16 of the said insert 15 there is interposed a spiral compression spring 25, which normally tends to force the valve 24 upward. Threaded into the reservoir 10, is a funnel shaped diaphragm 26 formed on its upper central portion with a conical projection 27 constituting a seat for the ball valve 24, and apertured at 28 for the passage therethrough of the valve stem 23. On the lower face of the diaphragm 26, there is provided an open-ended cylindrical extension 29 the lower peripheral edge whereof is preferably serrated at 30 for the purpose hereafter explained.

A cover or cap 31 is threaded into the top of the reservoir 10 and it is formed with an annular peripheral flange 32 housing a suitable packing ring 33 so that when said cover 31 is screwed on the reservoir an airlock is created, and it is to be here particularly noted that the upper end of the valve stem 23 is provided with a removable milled head or nut 34 which abuts a central depression 35 in the cover. An air vent 36, is provided below the diaphragm 26 for the purpose hereafter set forth, while lugs 37 having holes 38 therein are furnished on the upper side of said diaphragm 26 to receive the ends of an appropriate tool whereby the diaphragm may be threaded down into the reservoir and adjusted to the required level, or removed when desired for cleansing or removal.

In the modified form of the invention shown in Fig. 5 it is to be observed that the conical diaphragm 26 is provided with a depending peripheral flange 39 as against the upwardly projecting one shown in Fig. 1, and that the valve seat is constituted by a superposed disk 40 which is threaded into the reservoir until it closely abuts the upper edge of said diaphragm 26. This construction is more particularly applicable where it is necessary to insure as large a lubricant capacity in the device as possible; or, in other words it is solely devised to economize space. Apertured projections 41, are provided in the disk 40 for its easy manipulation by the same tool that manipulates the diaphragm 26.

The assembly and operation or use of my improved vibrating lubricator are briefly as follows:—The concavo-convex insert 15 is first threaded down into the reservoir by inserting a suitable tool or rod into the hole 21, whereupon the valve stem 23 and spring 25 are placed in position—the nut 34 having been first removed—whereupon the conical diaphragm is threaded down to adjusted position with the valve 24 abutting the seat 27. Lubricant 42, is next poured or filled into the reservoir 10 when the cover 31, is threaded thereon—after the nut 34 has been replaced—and as said cover 31 is screwed down tight it will be readily seen that the valve 24 will be downwardly forced from its seat and the lubricant 42 will flow downwardly into the convex shaped dish 16 until it rises to the level shown at 43 where it will seal any further outflow of said lubricant. Now assuming that the part of the machine or engine on which the device is installed is subject to constant or intermittent vibration it will be readily seen that any vibration will cause the lubricant contained in the dish 16 to be washed to one side or the other over the edge of the chamfered periphery 20 of the insert 15 whereupon it will pass down the channels 19 and traverse the connecting tapered grooves 18 to the central under part of said insert 15, from whence it will drop or flow globule by globule down the outlet 44 onto the part or parts to be kept lubricated. Furthermore it will be seen that according to the degree of vibration there will be a correspondingly increased or decreased feed of the lubricant, and that the air vent 36 provides for the prompt replacement of the air which bubbles up through or past the extension 29 as the lubricant flows downwardly after each "splash" while the serrations 30 aid in breaking up or dispersing said "splash" as well as assisting in breaking up the inflow of air and thereby aiding very materially in the prompt resealing after each splash or wash over of the lubricant from the dish 16.

From the foregoing it will be readily seen that the action described will continue so long as the necessary degree of vibration exists or whenever it takes place and that the supply of lubricant will be continued in more or less regulated quantity to the part or parts to be kept lubricated, while it will be easily understood that by moving the conical diaphragm 16 closer to or farther away from the concavo-convex insert 15 a smaller or greater "splash" or feed can be regulated, while when it is desired to flush the lubricator all that is necessary is to remove the cover 31 and tap the valve stem 23 by the nut 34 downward a few times with the finger or hand which will promptly result in cleaning the device. Still further it will be observed that in the event of any trouble with a lubricator as above described and shown the various parts can be readily separated, and equally true is it that the several parts can as readily be reassembled again. Moreover by reason of the air lock 33, dust and dirt are prevented from admixture with the lubricant, and while I have shown and described preferred embodiments of my invention it is to be clearly understood that various slight changes in the shape and arrangement of the several parts can be effected without departing from the spirit and scope thereof, such changes and other combinations being however limited to the scope and ambit of the appended claims.

Having described my invention what I claim as new and desire to secure by Letters Patent is:—

1. A vibratory lubricator comprising a reservoir for the lubricant and having an outlet therefrom, a concavo-convex insert seated in said reservoir and having grooves connecting the upper and lower surfaces thereof, a diaphragm disposed in spaced relation to the concavo-convex insert and including a valve seat and a cylindrical extension, a valve located in said cylindrical extension and having an upwardly projecting stem, and a cover for said reservoir adapted for coöperation with the head of the valve stem to normally keep the valve open.

2. A vibratory lubricator comprising an internally threaded reservoir for the lubricant and having an outlet therefrom, a concavo-convex insert threaded into said reservoir and having grooves connecting the upper and lower surfaces thereof, a diaphragm threaded into spaced relation to the concavo-convex insert and including a valve seat and depending cylindrical extension, a valve located in said cylindrical extension and having an upwardly projecting stem, and a cover for said reservoir adapted for coöperation with the head of the valve stem to normally keep the valve open.

3. A vibratory lubricator comprising an internally threaded reservoir for the lubricant and having an outlet therefrom, a concavo-convex insert threaded into said reservoir and having radial grooves on its underside connecting with peripheral vertical channels, a diaphragm threaded into spaced relation with the concavo-convex insert and having an upstanding conical projection constituting a valve seat and a downwardly extending cylindrical extension, a ball valve located in said cylindrical extension and having an upwardly projecting stem, and a cover for the reservoir adapted for coöperation with the head of the valve stem to normally keep the valve open.

4. A vibratory lubricator comprising an internally threaded reservoir for the lubricant and having an outlet therefrom, a concavo-convex insert threaded into said reservoir and having radial tapered grooves on its underside connecting with vertical channels on its peripheral edge the upper or convex surface constituting a dish and having a chamfered edge connecting with the vertical channels, a funnel shaped diaphragm threaded into spaced relation with the concavo-convex insert and having an axially central conical projection constituting a valve seat and a downwardly extending cylindrical part projecting below the upper edge of the aforesaid dished part of the concavo-convex insert, a spring influenced ball valve located in said cylindrical extension and having an upwardly projecting stem, and a cover for the reservoir adapted for coöperation with the head of the valve stem to normally keep the valve open.

5. A vibratory lubricator comprising an internally threaded reservoir for the lubricant and having an outlet therefrom, a concavo-convex insert threaded into said reservoir and having radial tapered grooves on its underside connecting with vertical channels on its peripheral edge the upper or convex surface constituting a dish and having a chamfered edge connecting with the vertical channels, a funnel shaped diaphragm threaded into spaced relation with the concavo-convex insert and having an axially central upstanding conical projection constituting a valve seat and a downwardly extending cylindrical part projecting below the upper edge of the aforesaid dished part of the concavo-convex insert, a spring influenced ball valve located in said cylindrical extension and having a stem extending downwardly for slidable movement in the concavo-convex insert and upwardly into engagement with the reservoir cover, said cover being adapted for coöperation with the head of the valve stem to normally keep the valve open.

6. A vibratory lubricator comprising an internally threaded reservoir for the lubricant and having an outlet therefrom, a concavo-convex insert threaded into said reservoir and having radial tapered grooves on its underside connecting with vertical channels on its peripheral edge the upper or convex surface constituting a dish and having a chamfered edge connecting with the vertical channels, a funnel shaped diaphragm threaded into spaced relation with the concavo-convex insert and having an axially central upstanding conical projection constituting a valve seat and a downwardly extending cylindrical part projecting below the upper edge of the aforesaid dished part of the concavo-convex insert, a spring influenced ball valve located in said cylindrical extension and having an axially vertical stem having slidable connection in the concavo-convex insert at its lower end, and a cover for the reservoir having an annular flange and packing for air locking said reservoir when filled, said cover being adapted for coöperation with the head of the valve stem to normally keep the valve open.

7. A vibratory lubricator comprising an internally threaded reservoir for the lubricant and having an outlet therefrom, a concavo-convex insert threaded into said reservoir and having radial tapered grooves on its underside connecting with vertical channels on its peripheral edge the upper or convex surface constituting a dish and having a chamfered edge connecting with the vertical channels, a funnel shaped diaphragm threaded into spaced relation with the concavo-convex insert and having an axially central upstanding conical projection constituting a valve seat and a downwardly extending cylindrical part projecting below the upper edge of the aforesaid dished part of the concavo-convex insert, the lower edge of said cylindrical part being serrated, an air vent in the reservoir below the funnel-shaped diaphragm, a spring influenced ball valve located in said cylindrical extension and having an upwardly projecting stem, and a cover for the reservoir adapted for coöperation with the head of the valve stem to normally keep the valve open.

8. A vibratory lubricator comprising a reservoir for the lubricant and having an outlet therefrom, a concavo-convex insert seated in said reservoir and having grooves connecting the upper and lower surfaces thereof, a diaphragm disposed above the concavo-convex insert and including a valve seat and cylindrical extension, a valve located in said cylindrical extension and having an upwardly projecting stem, and a sealing cover for said reservoir adapted for coöperation with the head of the valve stem to normally keep the valve open.

9. A vibratory lubricator comprising an internally threaded reservoir for the lubricant and having an outlet therefrom, a concavo-convex insert threaded into said reservoir and having radial grooves connecting the upper and lower surfaces thereof, a disk diaphragm threaded into position above the concavo-convex insert and including a valve seat and cylindrical extension, a spring influenced valve located in said cylindrical extension and having an upwardly projecting stem, and a sealing cover for said reservoir adapted for coöperation with the head of the valve stem to normally keep the valve open.

In testimony whereof I affix my signature.

ALLEN A. VAN ORSDALE.